United States Patent
Lemkin et al.

(10) Patent No.: US 8,570,904 B2
(45) Date of Patent: Oct. 29, 2013

(54) LOCALIZATION IN A NETWORK

(75) Inventors: Mark Lemkin, Berkeley, CA (US);
Thor Juneau, Menlo Park, CA (US);
Lance R. Doherty, Berkeley, CA (US)

(73) Assignee: Dust Networks, Inc., Hayward, CA (US)

(*) Notice: Subject to any disclaimer, the term of this patent is extended or adjusted under 35 U.S.C. 154(b) by 33 days.

(21) Appl. No.: 13/330,758

(22) Filed: Dec. 20, 2011

(65) Prior Publication Data

US 2012/0087272 A1    Apr. 12, 2012

Related U.S. Application Data

(63) Continuation of application No. 12/378,773, filed on Feb. 18, 2009, now Pat. No. 8,102,784.

(51) Int. Cl.
*H04L 12/28* (2006.01)

(52) U.S. Cl.
USPC .................. 370/255; 370/252; 455/456.1

(58) Field of Classification Search
USPC ............ 370/255, 328, 503; 455/455.6
See application file for complete search history.

(56) References Cited

U.S. PATENT DOCUMENTS

| | | | |
|---|---|---|---|
| 8,102,784 B1 * | 1/2012 | Lemkin et al. | 370/255 |
| 2005/0143100 A1 * | 6/2005 | Shi et al. | 455/456.6 |
| 2005/0175038 A1 * | 8/2005 | Carlson et al. | 370/503 |
| 2009/0028092 A1 * | 1/2009 | Rothschild | 370/328 |
| 2009/0316601 A1 * | 12/2009 | Zhu et al. | 370/254 |
| 2010/0014443 A1 * | 1/2010 | Cristian et al. | 370/255 |
| 2010/0178932 A1 * | 7/2010 | Hansson | 455/456.1 |

* cited by examiner

*Primary Examiner* — Albert T Chou
(74) *Attorney, Agent, or Firm* — McDermott Will & Emery LLP

(57) ABSTRACT

A system for determining node locations comprises an interface for receiving a first set of measurements at a first set of nodes, the first set of nodes having known locations. The system further comprising an interface for receiving a second set of measurements at a node having an unknown location, and a processor configured for determining a location of the node with unknown location based at least in part on the first set of measurements and the second set of measurements.

24 Claims, 10 Drawing Sheets

LOCALIZATION IN A NETWORK

CROSS REFERENCE TO OTHER APPLICATIONS

This application is a continuation of co-pending U.S. patent application Ser. No. 12/378,773, entitled LOCALIZATION IN A NETWORK filed Feb. 18, 2009 which is incorporated herein by reference for all purposes.

BACKGROUND OF THE INVENTION

Distributed sensor networks utilize a set of sensors performing measurements across time and space to gather information about their environment. The sensors typically use wireless communication (e.g., radio transmission) to send their measured data to a central computer system, which accumulates the data and builds it into a larger picture. In some distributed sensor network systems, the sensor nodes are distributed in space randomly or without knowledge of their position or sensor nodes are not stationary (e.g., are able to move or are attached to an object that moves). Distribution of sensors in this way can be of considerably lower cost than ensuring precise sensor positioning, and data produced by sensors distributed in this way can still be valid and useful. For some applications, random sensor distribution is acceptable, but it is advantageous to know precisely the eventual sensor locations or the location of sensors that move.

Some systems (e.g., global positioning (GPS) systems) accomplish localization of nodes using time of flight measurements and clock systems on each node that are very accurate and synchronized precisely. In systems designed for low cost and low node power consumption, these methods are not feasible.

BRIEF DESCRIPTION OF THE DRAWINGS

Various embodiments of the invention are disclosed in the following detailed description and the accompanying drawings.

DETAILED DESCRIPTION

Figure 1A:
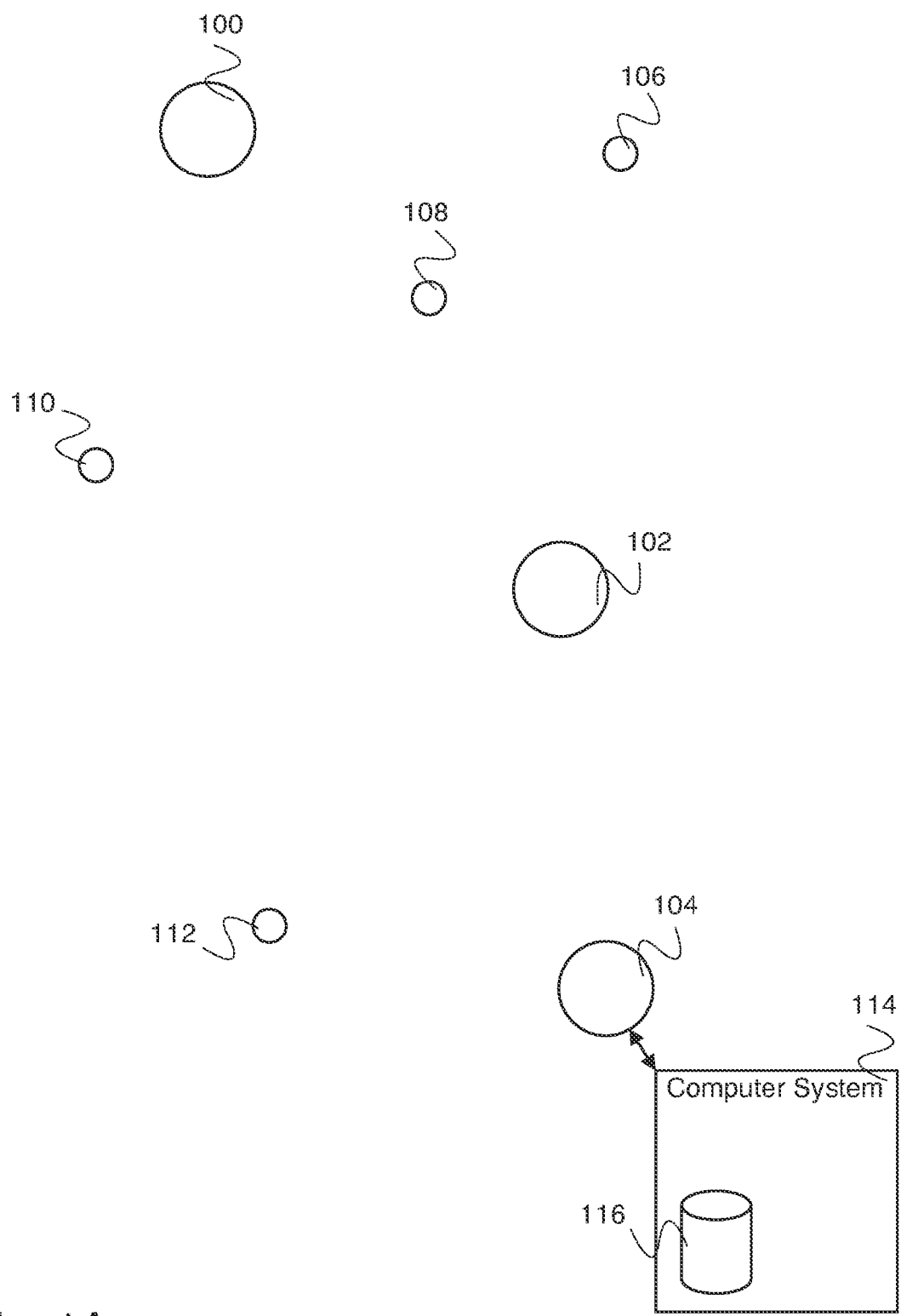
FIG. 1A is a diagram illustrating an embodiment of a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Localization in a network is disclosed. Localization of nodes whose location is unknown within a network is accomplished by using time difference of flight measurements sent from nodes with known locations. Compared with a system using time of flight measurements, a system using time difference of flight measurements as disclosed herein has a reduced requirement on timing accuracy and synchronization between nodes, enabling the lowering of system cost and the lowering of total power consumption. The localization system using a series of measurements and in some cases location information compensates for relative phase and frequency synchronization issues to achieve measurement of location for nodes. A fraction of the network nodes are placed in such a way that their location is known. The remainder of the network nodes are placed in such a way that their location is not known. A pair of nodes with known locations is selected, and each of the two nodes transmits a localization signal. A localization signal comprises a signal whose propagation characteristics are known and that can be used in the localization of a node. By measuring the amount of time one or more localization signals take(s) to propagate from one or more known locations to an unknown location enables establishing a distance from a known location to the unknown location. In various embodiments, a localization signal comprises a data packet (e.g., an IEEE 802.15.4 compliant packet); a repeated pattern of modulation data that can be correlated against a reference pattern (e.g., a modulated pseudo-noise sequence—for example, a MSK-modulated PN9 sequence); an impulse (e.g., an ultra-wideband transmission); an impulse train, or any other appropriate localization signal. In some embodiments, data is sent as part of a payload of the localization signal. The remaining nodes listen for the two localization signals and measure the times at which they were received. In some embodiments, the measurements or relevant quantities derived from the measurements are sent back to a central computer system. Measurements of the time difference of reception by nodes of known location, in conjunction with known spatial information between the transmitting known nodes and receiving known nodes, are used to determine the actual time difference between the transmission of the localization signals. Measurements of the time difference of reception by nodes of unknown location are then used to determine as much information as possible about the location of the nodes of unknown location. In various embodiments, the process is then repeated with different pairs of known location nodes transmitting localization signals, until a plurality of known location nodes have transmitted localization signals, until all pairs of known location nodes have transmitted localization signals, until the location of the unknown location nodes have been determined satisfactorily, or until any other appropriate termination criterion. In some embodiments, three or more known location nodes transmit localization signals in rapid succession so that multiple time difference of arrival measurements are made in a more efficient manner—for example, if known nodes A, B, and C send out localization information in succession, the time difference of arrival at known and unknown nodes may be determined by looking pairwise at time differences: A & B; A & C; B & C.

In some embodiments, a series of transmissions/receptions between nodes that have known locations with known desired time intervals between transmissions are used to determine the relative frequencies and relative offsets of the time clocks for each of the nodes. Once the relative frequencies and relative offsets are known, these are used to determine the locations of nodes having unknown locations. For example, node A sends transmission 1 at time 1 to node B which receives the transmission at time 2 and node B sends to node A at time 3 (e.g., where time 3 is after a specific interval from time 2) transmission 2 back to node A which receives the transmission at time 4; the relative clock frequencies between clocks of node A and node B are calculated using: 1) the difference between time 1 and time 4; 2) the difference between time 2 and time 3; and 3) the distance between node A and node B and the velocity of the signal between node A and node B (and node B and node A). Or for example, node A sends to node B a transmission at time 1 and at time 2 after a specific interval, the arrival times at node B are used to calculate the relative frequency differences between the clocks and a phase offset at a particular time. Similarly, a relative frequency between clocks of node A and node C and/or a phase offset are determined. The relative frequency and phase offsets between node A and node B (and/or node C) are used to determine a node whose location is not known.

In some embodiments, the relative phase and frequency of the clocks of the nodes with unknown locations are synchronized using a series of transmissions/receptions between nodes that have known locations with known desired time intervals between transmissions. In some embodiments, the sequence of measurements or techniques used to measure the relative phase and frequency of the clocks of the nodes with unknown locations is similar to the measurements or techniques used to measure the relative phase and frequency of the clocks of the nodes with known locations.

In some embodiments, it is desirable to determine the position or track the position of various nodes—for example, a node attached to a piece of equipment, a node attached to the location of boxes of inventory in a warehouse, or a node attached to one or more people. In some embodiments, a node does not include a sensor. In some embodiments, the output of a node or of the network includes the location of one or more nodes of the network.

FIG. 1A is a diagram illustrating an embodiment of a network. In various embodiments, the network comprises a mesh network of nodes, comprises a network of nodes, comprises a mixture of network node types, or any other appropriate network. In the example embodiments following the network comprises a mesh network of nodes although in other embodiments any other appropriate network or combination of networks in which nodes of the network(s) include nodes associated with one (or more) type(s) of networks are part of the network. In the example shown, the network of FIG. 1 comprises a mesh network of nodes of known location (e.g., node 100, node 102, and node 104), and network nodes of unknown location (e.g., node 106, node 108, node 110, and node 112). In some embodiments, the nodes of known location are deployed to predetermined locations. In some embodiments, the nodes of known location are deployed randomly and their positions are measured. In some embodiments, the nodes of known location are not movable. In some embodiments, the nodes of unknown location are deployed randomly. In some embodiments, the nodes of unknown location are moveable.

In the example shown, the network nodes each comprise a transmitter and a receiver and are capable of communicating with one another. In some embodiments, the total distance over which the nodes are distributed is larger than the maximum distance a node can transmit a signal and be reliably heard by another node. In the example shown, the nodes are able to relay transmissions, allowing any node to communicate with any other node as long as a diagram showing connections between nodes that are capable of communicating with each other has no isolated nodes or isolated groups of nodes. Node 104 is connected to computer system 114, allowing any node in the mesh network to communicate with computer system 114. Node 104 is a gateway node for the mesh network, connecting the mesh network to an outside network. In some embodiments, there is more than one gateway node in the mesh network. In some embodiments, the mesh network is connected to more than one outside network. In various embodiments, computer system 114 is connected to a local network, a wireless network, a wide area network, the Internet, or any other appropriate network. In some embodiments, computer system 114 is capable of processing data sent to it through the mesh network. Computer system 114 includes storage 116.

Figure 1B:
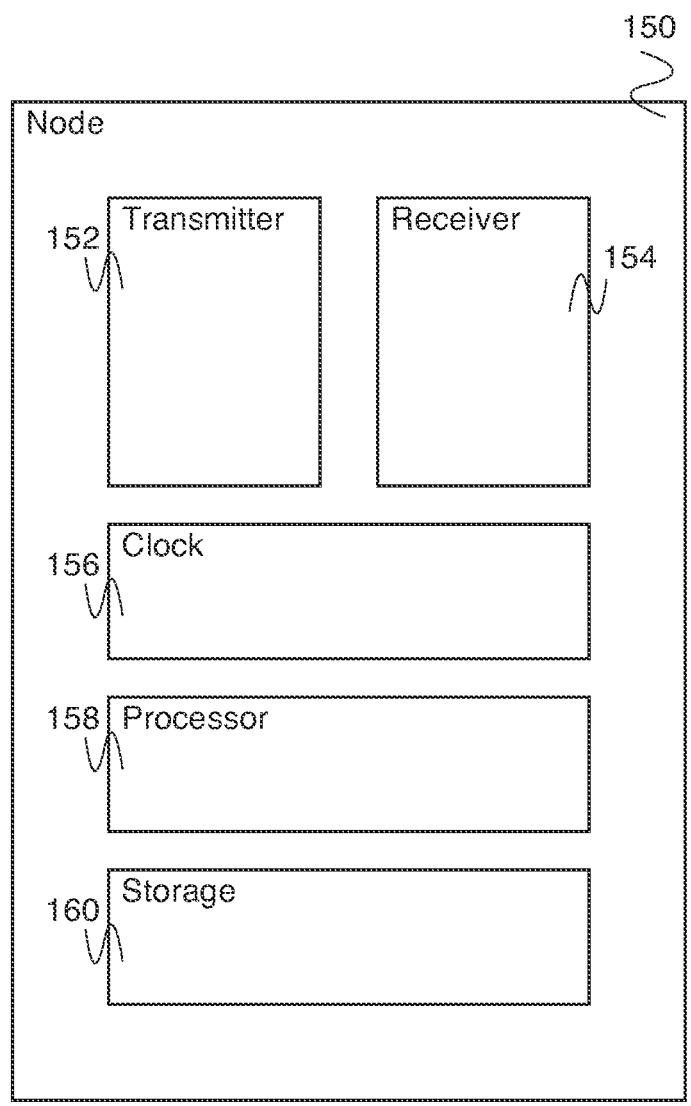
FIG. 1B is a block diagram illustrating an embodiment of a node.

FIG. 1B is a block diagram illustrating an embodiment of a node. In some embodiments, node 150 of FIG. 1B is part of a mesh network (e.g., node 102, node 104, node 106, node 108, node 110, and/or node 112 of the mesh network of FIG. 1A). In the example shown, node 150 comprises transmitter 152, receiver 154, clock 156, processor 158, and storage 160. Transmitter 152 and receiver 154 enable node 150 to communicate with other nodes and/or with other systems that include transmitters and/or receivers. In various embodiments, transmitter 152 and/or receiver 154 communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the Institute of Electrical and Electronics Engineers (IEEE) 802.15.4 standard, signals according to the Bluetooth protocol, signals according to the ultra wide bandwidth (UWB) approach, or signals encoded using any other appropriate scheme. In various embodiments, transmitter 152 and/or receiver 154 communicate in the medium frequency band, the high frequency band, the very high frequency band, the ultra high frequency band, or any other appropriate frequency band. In some embodiments, transmitter 152 and/receiver 154 communicate using the industrial, scientific, and medical (ISM) bands (e.g., 902-928 MHz, 2.400-2.500 GHz, 5.725-5.875 GHz, etc.). In some embodiments, node 150 includes a battery and is designed to require infrequent battery replacement (e.g., a low power node that has a battery change once a month, once a few months, once a year, once every few years, etc. depending on the application). In some embodiments, node 150 includes systems designed to gather and store energy from the environment (e.g., light energy from the sun or other light energy sources, mechanical energy from vibration of the node, or any other appropriate environmental energy source).

In some embodiments, clock 156 is implemented using an inexpensive oscillator (e.g., a watch crystal—for example, a 32 KHz quartz crystal oscillator). In some embodiments clock 156 may be incremented using a quartz crystal oscillator used for the radio transmitter or receiver (e.g., a 20 MHz clock). In various embodiments, a single oscillator (e.g., a low frequency low power oscillator or an oscillator associated with a transmitter/receiver) or two oscillators (e.g., a combination of a low frequency low power oscillator and an oscillator associated with a transmitter/receiver) is/are used for time stamping the reception/transmission of a localization signal. Compared with systems that compute node position by time-of-flight measurements (e.g., GPS systems), the requirements on the accuracy of clock 156 are significantly reduced, due to the timing calibration performed during the time-difference-of-flight measurement.

In some embodiments, processor 158 controls transmitter 152, receiver 154, and clock 156. In some embodiments, processor 158 measures arrival times of localization signals. In some embodiments, processor 158 calculates a time difference of arrival of localization signals. In some embodiments, processor 158 calculates other derived data from the arrival times of localization signals. In some embodiments, processor 158 calculates a time difference of signal transmission from a time difference of signal arrivals in the event that node 150 has a known location. In some embodiments, processor 158 calculates a time difference of signal transmission from a time difference of signal arrivals in the event that node 150 has an unknown location. In some embodiments, processor 158 calculates the position or a set of possible positions of node 150 from a time difference of signal arrivals in the event that node 150 has an unknown location. In some embodiments, storage 160 is accessible to processor 158 for storing and retrieving of information.

Figure 2A:
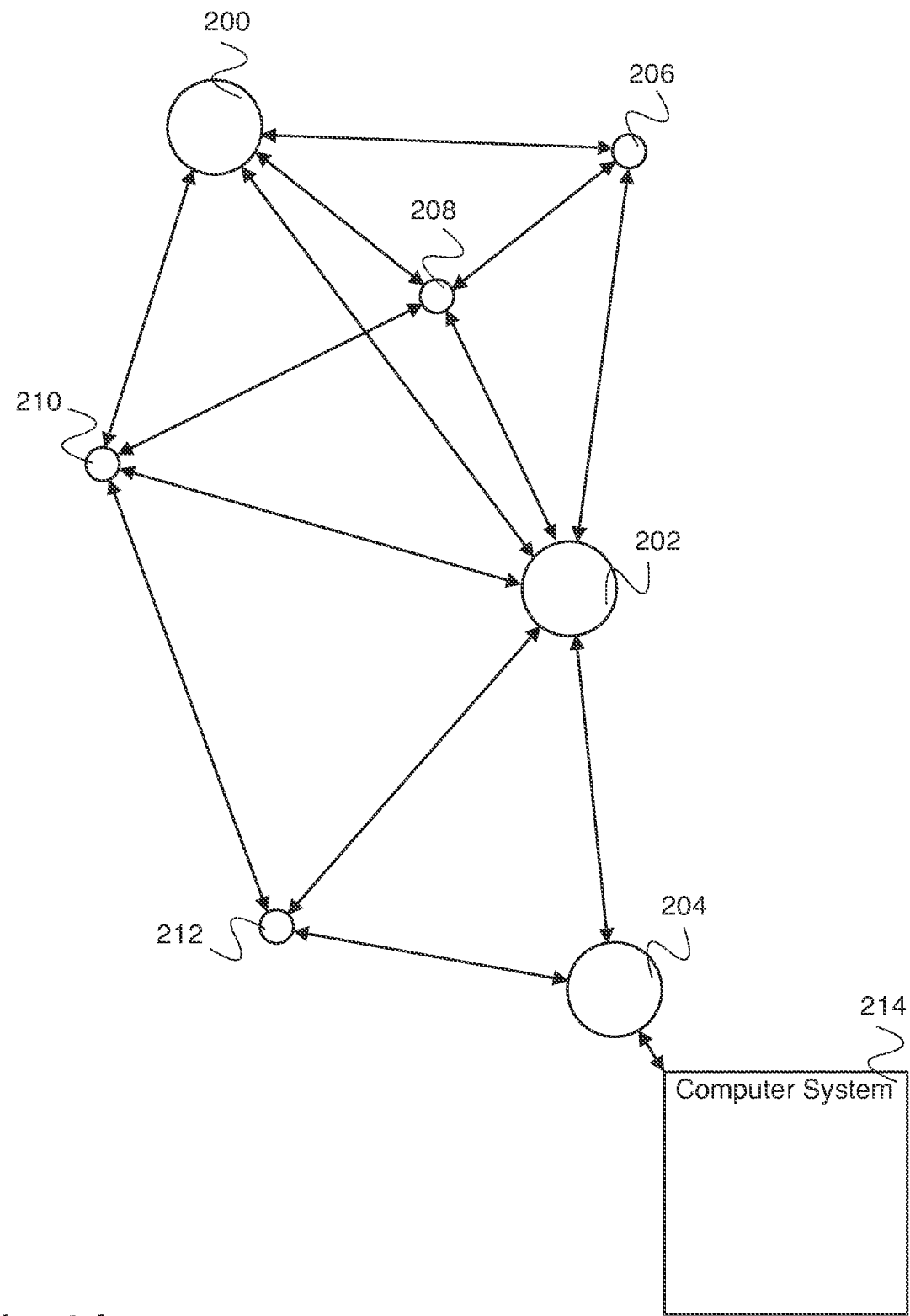
FIG. 2A is a diagram illustrating an embodiment of a mesh network.

FIG. 2A is a diagram illustrating an embodiment of a network. In some embodiments, the network of FIG. 2A represents the network of FIG. 1A. In the example shown, nodes comprise transmitters (e.g., transmitter 152 of FIG. 1B) and receivers (e.g., receiver 154 of FIG. 1B) and are able to communicate directly with other nodes that are located within a certain distance. For example, node 200 is able to communicate directly with node 202, node 206, node 208, and node 210, but not with node 204 or node 212. Node 204 is able to communicate directly with node 202 and node 212 but not with node 200, node 206, node 208, or node 210. Node 200 is able to communicate indirectly with node 204 by having its messages received and retransmitted by node 202.

Gateway node 204 is connected to computer system 214. In some embodiments, any node is able to communicate with computer system 214 by communicating with gateway node 204, either directly or indirectly, and gateway node 204 is able to communicate with computer system 214.

In various embodiments, the network nodes are synchronized to a gateway node clock, a node clock, a reference clock or any other appropriate clock. In some embodiments, synchronization uses sending and receiving timing information between network nodes and/or gateway nodes to synchronize network node clocks and/or gateway clocks. In some embodiments, synchronization comprises a clock in one network node and another network node each having a clock that indicates a time that can be used to determine communication windows during which communication between the two nodes takes place.

Figure 2B:
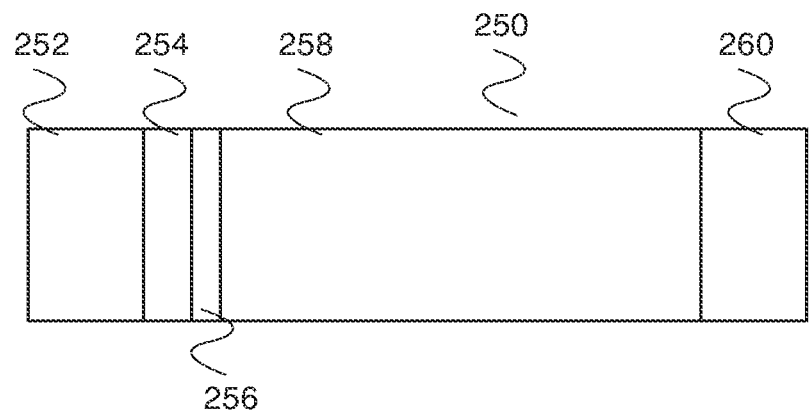
FIG. 2B is a block diagram illustrating an embodiment of a data packet.

FIG. 2B is a block diagram illustrating an embodiment of a data packet. In the example shown, data packet 250 includes preamble 252, start-of-frame delimiter (SFD) 254, packet length 256, payload 258, and checksum 260. Preamble 252 comprises a sequence of bits for synchronizing a clock for reading payload 258. SFD 254 comprises a sequence of bits indicating the start of the information portion of data packet 250. Packet length 256 comprises a series of bits from which the length of payload 258 can be determined. Payload 258 comprises the data payload of data packet 250. In various embodiments, payload 258 includes information that is used to determine time of transmission, time of reception, turnaround time, distance or any other appropriate information for determining distance. Checksum 260 is calculated using a cyclic redundancy check (CRC) operating on payload 258, and is used to determine whether payload 258 has been received without error. In some embodiments, data packet 250 is compliant with Institute of Electrical and Electronics Engineers (IEEE) 802.15.4 standard. Data packet 250 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence, or any other appropriate mapping between chips and data bits. In some embodiments, data packet 250 is used to determine a distance between radio transceivers.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, or chip.

In some embodiments, a time of arrival measurement uses the time of reception of a packet according to a local clock. In various embodiments, the time of reception comprises the time of reception of the beginning of the packet, a portion of the received signal packet, a time measured using one or more of the signals comprising the packet (e.g., an average phase measurement of the signals of a received packet), or any other appropriate time.

In some embodiments, the accuracy of the time of arrival measurement is improved using a measurement of a correction to the time of arrival of a packet. The correction of the time enables the time to be of higher resolution than a receiving node's clock (e.g., a data clock or receiver clock). The correction of the time is based at least in part on one or more phase offset measurements of the arriving data bits or chips with respect to a receiving node's clock. In some embodiments, averaging the phase offset measurements reduces noise and increases accuracy of the phase offset measurement. In some embodiments, a difference in the time of a zero-crossing of a received signal as compared to a local oscillator signal is stored for one or more zero-crossings of a received signal associated with a data packet. In some embodiments, the one or more differences in time of the zero-crossings are averaged to give a correction to the time of arrival of the data packet. In various embodiments, a feature of the signal (e.g., a peak, a minimum, a maximum, a zero-crossing, etc.) and, if appropriate, an average of measurements made using a plurality of features of the signal, is/are used to increase the accuracy of the time of arrival measurement.

In various embodiments, other factors accounted for in order to enable an accurate distance measurement are: 1) the relative differences in time base (e.g., a crystal oscillator) frequencies between the two transceivers; 2) the substantial and variable delay of baseband filters (e.g., the filters in a radio receive channel); and 3) the finite precision of a local time base for a transceiver. After determining the travel time between the two transceivers having taken into account the important factors, the distance traveled by the radio transmission is determined by multiplying the travel time by the speed of the radio transmission.

Figure 3:
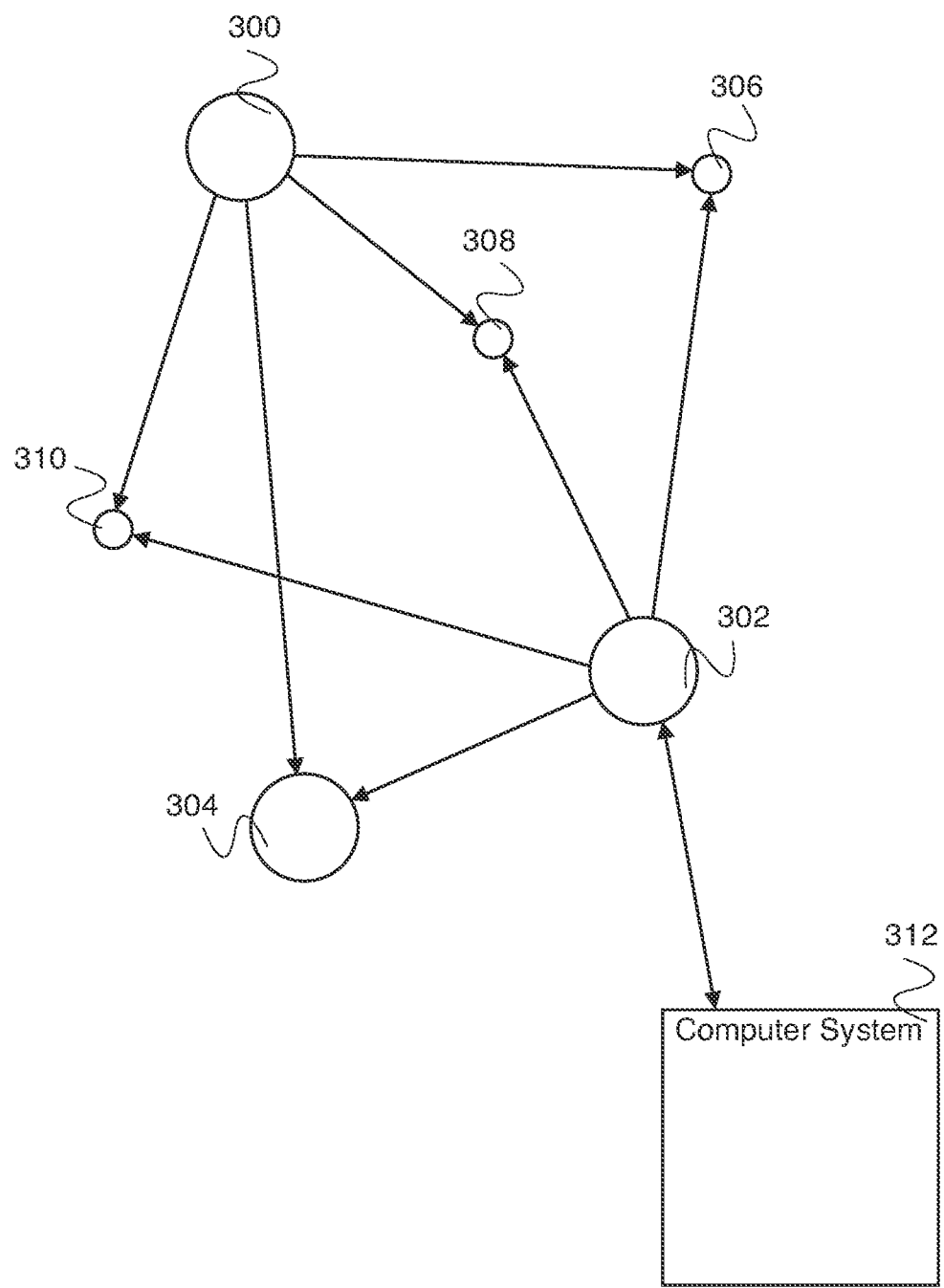
FIG. 3 is a diagram illustrating an embodiment of pairwise signal transmission in a mesh network.

FIG. 3 is a diagram illustrating an embodiment of pairwise signal transmission in a mesh network. In some embodiments, pairwise signal transmission is used by the mesh network of FIG. 1A as part of a method to determine the location of nodes of unknown location. In the example shown, node 300, node 302, and node 304 have known locations and node 306, node 308, and node 310 have unknown locations. Node 300 and node 302 transmit a signal which is received by node 304, node 306, node 308, and node 310. In some embodiments, node 300 and node 302 transmit signals sequentially, with a short period of time between when node 300 transmits and node 302 transmits, for example, on the order of 100's of micro-seconds to a few milliseconds. The precise interval between transmissions will be determined, among other things, by how accurate the clocks in node 300 and the clock in node 302 are, as well as the amount of time required to process the received signal and re-arm the receiver in the receiving nodes. In some embodiments, the transmitted signal comprises a data packet comprising a preamble and a start of frame delimiter. In some embodiments, the transmitted signal comprises a packet compliant with IEEE standard 802.15.4. In the example shown, node 300 and node 302 transmit signals sequentially with an approximately known time difference. Each of node 304, node 306, node 308, and node 310 measures the time difference of arrival. The mesh network of FIG. 3 is connected to computer system 312 (e.g., a computer system similar to computer system 114 of FIG. 1) through gateway node 302 (e.g., a gateway node similar to gateway node 104 of FIG. 1). In various embodiments, the gateway node is one of the pairwise transmitting nodes, the gateway node is not one of the pairwise transmitting nodes, and/or the gateway node is any appropriate node of the mesh network. In the example shown, the measured time differences of arrival at each of node 304, node 306, node 308, and node 310 are transmitted through the mesh network and gateway node 302 to computer system 312. Computer system 312 uses the time difference of arrival measurements at unknown location node 306, unknown location node 308, and unknown location node 310 to compute locations for the nodes. In some embodiments, computer system 312 uses the measured time difference of arrival measurement at known location node 304, along with a compensation factor to compensate for electromagnetic wave propagation delay due to the known distances from node 300 to 304 and from node 302 to node 304, to estimate the exact time difference of signal transmission by node 300 and node 302. This time difference is used to help in computing the location of the nodes. In some embodiments the transmitted signal is received by two or more nodes with known locations. The measured time difference of arrival at these known location nodes, along with appropriate compensation factors to compensate for electromagnetic wave propagation delay from node 300 to these nodes and from node 302 to these nodes, may be combined to estimate the exact time difference of signal transmission by node 300 and node 302. In various embodiments the combination may include averaging, median, weighted average where unequal weight is assigned to various estimates based upon an estimate of how accurate the time difference of signal transmission is deemed to be.

In some embodiments, the time difference between a signal transmission and a signal arrival may be used to help compute the location of nodes. In the above example based on FIG. 3, node 300 may record the time it transmits a signal to node 304, node 306, node 308, and node 310. Node 300 may also record the arrival time of a signal from node 302. A difference between the transmission time and the signal arrival time can be computed and used to compute the unknown locations of node 304, 306, 308.

In some embodiments, the Received Signal Strength (RSSI) at the receiver is used to determine the accuracy of individual time differences. In some embodiments, other available data such as acceleration, maps, known earlier locations, estimated earlier locations, temperature, or any other appropriate data are used to improve the location estimates.

In some embodiments the transmissions from known nodes are repeated on one or more channels for improved accuracy. Transmitting on multiple channels can help in locating unknown nodes and estimating the exact time difference of signal transmission by giving additional frequencies with different effective propagation lengths due to multipath.

In some embodiments, a pairwise signal transmission in a mesh network takes approximately 5 ms per pair of known location nodes transmitting IEEE 802.15.4 localization signals of 50 Byte payload length. In some embodiments, approximately five iterations of pairwise signal transmission on each of 15 channels in the 2.4 GHz ISM band are performed to determine the location of all unknown location nodes for a total TDOA sampling time of approximately 225 ms per fixed node pair. In some embodiments TDOA of five known-node pairs are sampled per fix for a total TDOA sampling time of approximately 1.125 seconds. A conservative estimate of power consumption would be 100% duty cycling of the receiver for the entire 1.125 seconds (e.g., receiver 154 of FIG. 1B). In some embodiments, the node receiver draws approximately 2 mA of current, yielding a total charge consumption of 2.25 mC for each node during network localization. In some embodiments, a subset of 5 IEEE 802.15.4 channels are used, for a total of 0.75 mC per network localization. In some embodiments, each unknown location node is powered by a CR2032 watch battery, which contains approximately 600 C of charge when new, allowing approximately 0.8 million network localization processes to be run before the battery must be changed. In some embodiments, the network localization process is performed once every minute, yielding a total battery lifespan of approximately 1.5 years.

In some embodiments, after the location of unknown location nodes has been determined, the nodes with locations now known are used in pairwise signal transmission to determine the location of other nodes. In some embodiments, unknown location nodes are used as the transmitters for pairwise signal transmissions and time difference of flight measurements at the known location nodes are used to determine the location of the unknown location nodes. In some embodiments, pairwise signal transmission is transmitted by one known location node and one unknown location node, and time difference of flight measurements at the known location nodes are used to determine the location of the transmitting unknown location node and time difference of flight measurements at the unknown location nodes are used to determine the locations of the unknown location nodes.

Figure 4:
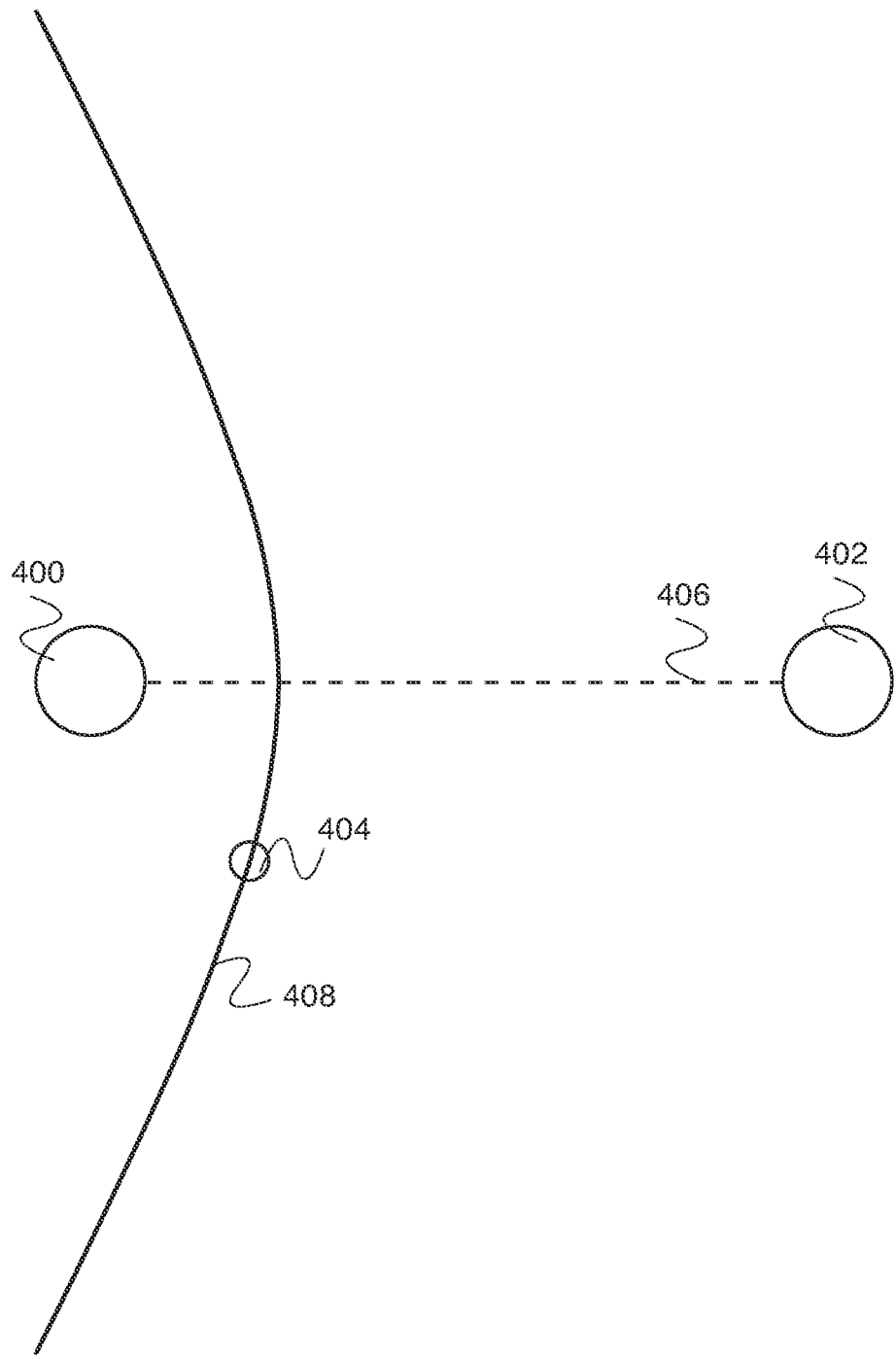
FIG. 4 is a diagram illustrating an embodiment of location calculation from a time difference of arrival measurement.

FIG. 4 is a diagram illustrating an embodiment of location calculation from a time difference of arrival measurement. In some embodiments, computer system 312 of FIG. 3 uses location calculation from a time difference of flight measurement to calculate the location of nodes of unknown location. In the example shown, node 400 and node 402 have a known location and perform a pairwise signal transmission (e.g., a pairwise signal transmission similar to that associated with FIG. 3). Node 404 has an unknown location and receives the transmissions of node 400 and node 402. In some embodiments, after receiving the transmissions of node 400 and node 402, node 404 computes the time difference of arrival and sends it to a computer system via a mesh network. In some embodiments, node 404 transmits the times of arrival of transmissions from node 400 and 402 to a computer system via a mesh network and the computer system calculates the time difference of arrival. The computer system subtracts the difference in transmission time from the time difference of arrival to calculate the time difference of flight. Given the time difference of flight, the computer system calculates the difference between the distance from node 404 to node 400 and from node 404 to node 402. The computer system then calculates a set of possible locations for node 404, based on the location of node 400 and node 402 and the calculated distance difference. In the example shown, node 400 and node 402 lie on line 406. The set of possible locations for node 404 in two-dimensional space are indicated by hyperbola 408, with its rightmost point where it crosses line 406. The set of possible locations for node 404 in three-dimensional space are represented by the hyperboloid defined by rotating hyperbola 408 about line 406. Hyperbola 408 extends off of the upper left and lower left of FIG. 4. In some embodiments, the set of possible locations of node 404 is constrained by the maximum transmission distance of node 400 and node 402. In some embodiments, after the set of possible locations for node 404 is computed, it is stored in a storage system (e.g., storage system 116 of FIG. 1). In some embodiments, the set of possible locations of node 404 is narrowed down by further location calculations using different pairs of nodes of known location. In some embodiments, a minimum-error estimate (e.g., an estimate found using least squares techniques) is calculated directly from a plurality of time difference of arrival measurements from known nodes in conjunction with the known nodes locations. In some embodiments, outlier measurements are discarded prior to calculating a minimum-error location estimate.

Figure 5:
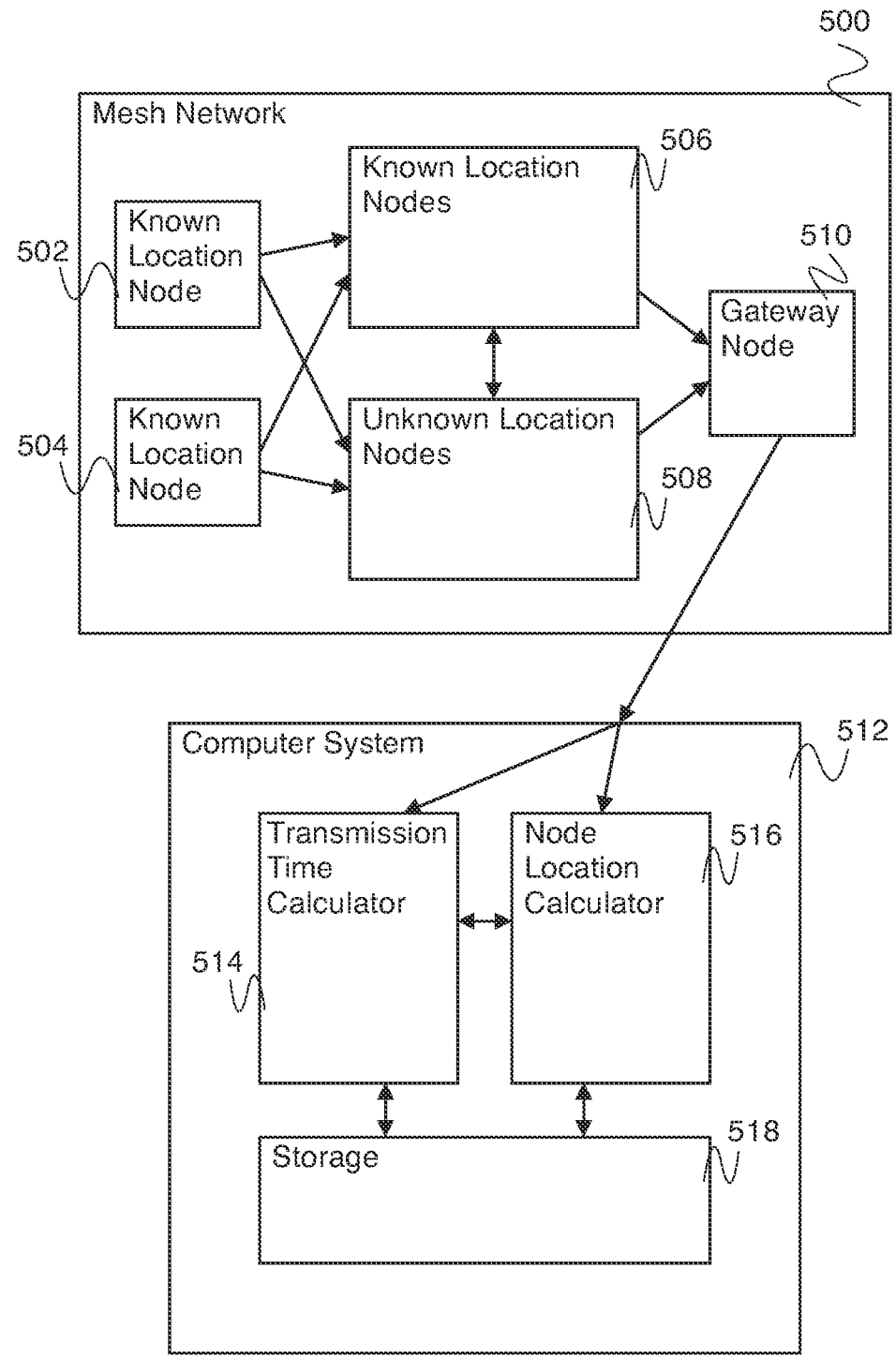
FIG. 5 is a block diagram illustrating an embodiment of a mesh network during a localization process.

FIG. 5 is a block diagram illustrating an embodiment of a mesh network during a localization process. In some embodiments, the mesh network of FIG. 5 represents the mesh network of FIG. 1. In the example shown, mesh network 500 comprises known location node 502 and known location node 504, one or more known location nodes 506, any number of unknown location nodes 508, and gateway node 510. In various embodiments, gateway node 510 comprises known location node 502, known location node 504, one node of known location nodes 506, or any other appropriate node of the mesh network. In various embodiments, set of known location nodes 506 comprises one node, a plurality of nodes, or any other appropriate number of nodes. In various embodiments, set of unknown location nodes 508 comprises one node, a plurality of nodes, or any other appropriate number of nodes. Each of the set of known location nodes 506 comprises an interface for receiving a first set of measurements (e.g. receiver 154 of FIG. 1B). In some embodiments, the first set of measurements is used to determine a first set of time difference of arrival measurements. Each of the set of unknown location nodes 508 comprises an interface for receiving a second set of measurements (e.g., receiver 154 of FIG. 1B). In some embodiments, the second set of measurements is used to determine a second set of time difference of arrival measurements. In some embodiments, the second set of time difference of arrival measurements comprises one time difference of arrival measurement. In some embodiments, the first set of measurements is used to calibrate the second set of measurements. During the localization process, known location node 502 and known location node 504 transmit a signal to all of the known location nodes 506 and unknown location nodes 508. In some embodiments, a time difference of arrival measurement comprises a difference in time of a) a first time of reception of a first signal from a first transmitting node (e.g. a transmitting node such as known location node 502 or known location node 504) and b) a second time of reception of a second signal from a second transmitting node (e.g. a transmitting node such as known location node 502 or known location node 504). In some embodiments, the first signal from the first transmitting node and the second signal from the second transmitting node are transmitted at substantially the same time. Transmitting substantially at the same time comprises transmitting nominally at the same time as determined locally by the transmitting node, using a network timing synchronization process (e.g. using synchronizing packets, etc.). In some embodiments, the first signal from the first transmitting node and the second signal from the second transmitting node are transmitted with a known time offset. Transmitting with a known time offset comprises transmitting nominally with a known time offset as determined locally by the transmitting node, using a network timing synchronization process (e.g. using synchronizing packets, etc.). In some embodiments, the known time offset is "known" by receiving node(s) and unknown by transmitting node(s). In some embodiments, a subset of known location nodes 506 and a subset of unknown location nodes 508 receives the transmitted signal (e.g., because the subset is within a range that can receive the transmitted signal, because the subset is tuned to the appropriate channel, or any other appropriate reason). Each node that receives signals from both node 502 and node 504 transmits the measured time difference of signal arrival through the mesh network and gateway node 510 to computer system 512. In some embodiments, mesh network 500 further comprises a second set of known location nodes, each comprising a transmitter, wherein each of the second set of known location nodes transmits a localization signal. In some embodiments, the localization signal comprises a data packet. In some embodiments, the localization signal comprises an IEEE 802.15.4 compliant data packet. In some embodiments, the localization signals sent by the second set of known location nodes are sent sequentially. In some embodiments, the localization signals sent by the second set of known location nodes are sent concurrently on different frequencies. In some embodiments, the second set of known location nodes comprises two or more nodes. In some embodiments, the nodes comprising the second set of known location nodes are further included in the first set of known location nodes. In some embodiments, set of known location nodes 506 and one of unknown location nodes 508 comprise a mesh network of nodes.

Computer system 512 comprises a processor configured for determining a location of an unknown location node based at least in part on measurements received by known location nodes 506 and unknown location nodes 508. In some embodiments, the node for which the location is determined is one of a plurality of nodes for which the location is determined. In some embodiments, computer system 512 includes an indicator (e.g., a monitor or a printer) for indicating the location of the node. Transmission time calculator 514 and node location calculator 516 receive communications sent to computer system 512 via gateway node 510. In some embodiments, transmission time calculator 514 receives measurements of time difference of signal arrival from known location nodes 506 and node location calculator 516 receives measurements of time difference of signal arrival from unknown location nodes 508. In the example shown, transmission time calculator 514 calculates the time difference between transmissions from known location node 502 and known location node 504, and node location calculator 516 determines the locations of unknown location nodes 508. In some embodiments, determining the location comprises keeping the determined location within a constrained space. In various embodiments, node location calculator 516 calculates the locations of one of unknown location nodes 508, a plurality of unknown location nodes 508, a predetermined fraction of unknown location nodes 508, all of unknown location nodes 508, or any other appropriate number of unknown location nodes. In various embodiments, the node for which the location is determined comprises a battery powered node, a solar powered node, a node powered by energy scavenging, a node powered by a power grid, or a node powered in any other appropriate way. In various embodiments, the timing difference between signal transmissions from node 502 and node 504 is determined using measurements of time difference of signal arrival at known location nodes, is determined by finding a value of time difference that keeps the calculated locations of the unknown location nodes within a constrained space, is determined using a combination of measurements of time difference of signal arrival at known location nodes and keeping the calculated location of the unknown location nodes in a constrained space, or is determined using any other appropriate method for determining time difference between signal transmissions.

In some embodiments, locations of known location nodes 506 are stored in storage 518. In some embodiments, transmission time calculator 514 uses the locations of known location nodes 506 as part of calculating the difference in time between transmissions from known location node 502 and known location node 504. In some embodiments, node location calculator 516 determines a set of possible locations of unknown location nodes 508. In various embodiments, node location calculator 516 stores locations or sets of possible locations of unknown location nodes 508 in storage 518, or any other appropriate location information. In some embodiments, the quality of each time difference of arrival measurement is estimated using a received signal strength indicator for the localization signals received.

In some embodiments, the number of time difference of arrival measurements yields an over-constrained measurement (for example, four different time difference of arrival measurements for a node located in two-dimensional space). In some embodiments, the set of measurements received at one or more of the unknown location nodes is over-constrained. In some embodiments, with an over-constrained measurement, all the measurements, or a portion thereof, are combined to estimate the location of an unknown node. In various embodiments, the combination includes averaging, median, weighted average where unequal weight is assigned to various estimates based upon an estimate of how accurate the time difference of signal transmission is deemed to be, a minimum-error optimization technique such as least squares or linear programming, and/or any other appropriate measurement. In some embodiments, the set of measurements received at one or more of the unknown location nodes is heavily over-constrained. A heavily over constrained set of measurements is defined as a set of measurements having at least twice the number of measurements required to constrain the node to its dimensional space. In some embodiments, over-constrained and/or heavily over-constrained measurements yield improved accuracy as well as an improved indication of the quality of the location fix, especially in environments with substantial multipath propagation interference. Due to the low precision clock synchronization requirements and the potential for low-cost fixed nodes, it is generally easy to construct a localization system that is heavily over-constrained.

In some embodiments, optimization is performed that includes a multipath propagation adjustment factor. In some embodiments, instructions for the processor (e.g., the processor of computer system 512) comprise a multipath propagation adjustment factor. The multipath propagation adjustment factor is a scale factor that is applied to a group of multiple paths that a transmission takes between a transmitting node and a receiving node; the multipath propagation adjustment factor scales the time difference of arrival measurements for all paths in the group to minimize location error. The multipath propagation adjustment factor helps to compensate for and reduce error in environments where multipath propagation causes systematic errors in the relationship between the straight line distance between two nodes and the amount of time that would be expected for radio waves to propagate this distance. In some embodiments, the multipath propagation adjustment factor is derived in an over-constrained situation by applying a scale factor to all time difference of arrival measurements in a group and sweeping the scale factor over a predetermined range (e.g., 0.5 to 2.0, meaning that the measured multipath distance is somewhere between one half and two times the actual straight-line distance) until a scale factor is found that minimizes the position error when all measurements are considered. In various embodiments, the group comprises all time difference of arrival measurements to a single node; the group comprises a portion of time difference of arrival measurements to a single node; the group comprises all time difference of arrival measurements in the entire network; the group comprises all time difference of arrival measurements in a defined space having a particular multipath propagation characteristic; the group comprises any other collection of paths. In some embodiments, a multipath propagation adjustment factor is determined on an over constrained measurement of a node and applied to a constrained measurement of a different node. In some embodiments, a multipath correction factor derived from propagation between known location nodes is used for correcting signals propagating between known and unknown location nodes.

In some embodiments, the computer system is encapsulated in one or more of the nodes of the mesh network. In some embodiments, each node encapsulates part of the computer system. In some embodiments, each known location node encapsulates part of transmission time calculator 514 and calculates its own estimate of transmission time difference. In some embodiments, each unknown location node encapsulates part of node location calculator 516 and calculates its location or set of possible locations. In some embodiments, the unknown location nodes receive information estimates of estimated transmission time difference from the known location nodes before calculating estimates of their position or set of possible positions.

Figure 6:
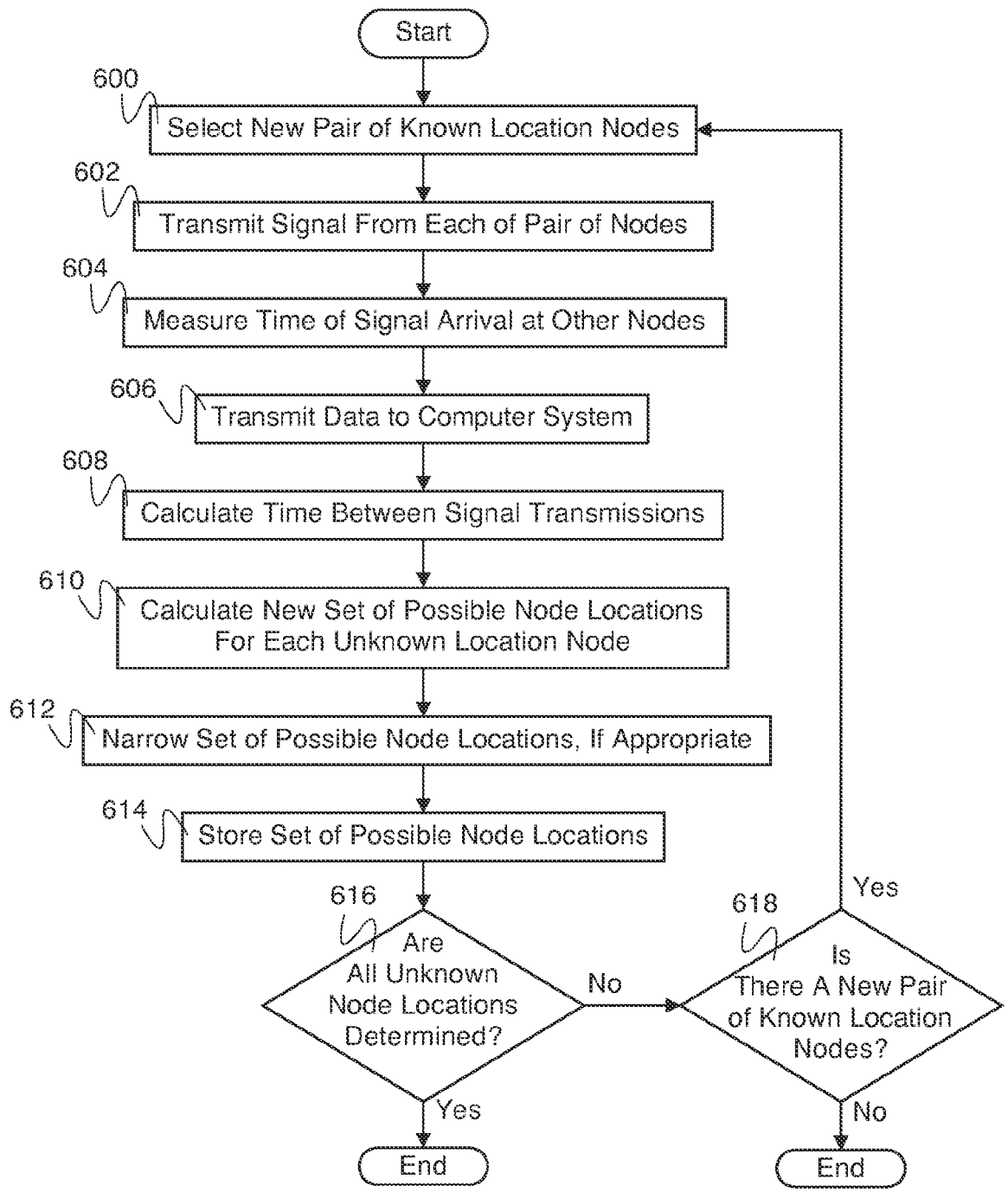
FIG. 6 is a flow diagram illustrating an embodiment of a process for localization in a mesh network.

FIG. 6 is a flow diagram illustrating an embodiment of a process for localization in a mesh network. In some embodiments, the process of FIG. 6 is used by mesh network 500 of FIG. 5 to determine node locations. In the example shown, in 600, a new pair of known location nodes is selected (e.g., known location node 502 and known location node 504 of FIG. 5). In 602, each of the pair of nodes transmits a signal (e.g., pairwise signal transmission of FIG. 3). In various embodiments, each of the pair of nodes transmits a signal at the same time, each of the pair of nodes transmits a signal at different times, each of the pair of nodes transmits a signal with a known time offset, or each of the pair of nodes transmits a signal with any other appropriate relative timing. In some embodiments, 3 or more nodes transmit signals. In the example shown, in 604, the time of signal arrival at each of the other nodes in the mesh network is measured with respect to a local time base. Each node calculates the time difference of arrival between the received signals. In some embodiments, the locations of one or more of the other nodes in the mesh network are known. In the example shown, in 606, data are transmitted to the computer system (e.g. computer system 512 of FIG. 5). In various embodiments, measurements of signal arrival time, calculations of signal arrival time difference, calculations of derived data, or any other appropriate data are transmitted to the computer system. In some embodiments, calculations are transmitted to the computer system through the mesh network. In some embodiments, calculations (e.g. estimated transmission time difference so that a node may make a local estimate of corrected time difference of arrival to see if a node has moved, for example) are transmitted from the mesh network to the computer system via a gateway node (e.g., gateway node 510 of FIG. 5).

In the example shown, in 608, the time between signal transmissions from the pair of nodes is calculated. In some embodiments, the calculation is performed using a transmission time calculator (e.g. transmission time calculator 514 of FIG. 5). In some embodiments, the difference in time of transmission of signals from the pair of nodes is determined using calculations of the time difference of signal arrival at nodes whose locations are known. In some embodiments, the difference in time of transmission of signals from the pair of nodes is determined using calculations of the time difference of signal arrival at nodes whose locations are known in conjunction with compensation for electromagnetic propagation delay between the known-location transmitting nodes and the known-location receiving nodes. In some embodiments, a correction is made that accounts for multipath effects to the measured time of arrival of a signal. In 610, a new set of possible node locations of each the unknown location nodes is calculated. In some embodiments, the new set of possible locations is calculated using a node location calculator (e.g. node location calculator 516 of FIG. 5) and is calculated based at least in part on the time difference of arrival measurements. In some embodiments, the node location calculator calculates the locations of the unknown nodes from the time difference of arrival measurements. In 612, the set of possible node locations is narrowed, if appropriate. In some embodiments, localization data is stored in matrix form and the matrix form is used to explicitly solve for an optimal location (e.g., using minimum-error optimization technique) and narrowing locations from a set of possible sets of locations is not required. In some embodiments, narrowing is achieved using a comparison of the current set of possible node locations with a previously stored set of possible node locations as performed by a node location calculator (e.g. node location calculator 516 of FIG. 5). The narrowed set of possible node locations comprises the intersection of the current and previous sets. In 614, the set of possible node locations is stored. For example, the set is stored in storage (e.g., storage 518 of FIG. 5).

In 616 it is determined if all unknown node locations are determined. In various embodiments, a node location is determined if the set of possible node locations determined contains only one location, if the locations in the set of possible node locations determined are less than a predetermined distance from one another, if the locations in the set of possible node locations determined are within a circle of a predetermined radius, or upon any other appropriate condition for establishing that a node location is determined. If all unknown node locations are determined, the process ends. In various embodiments, the process ends when a predetermined number of unknown node locations have been determined, when a predetermined fraction of unknown node locations have been determined, when a predetermined number of unknown node locations have not yet been determined, or according to any other appropriate completion criteria. In the example shown, if all unknown node locations are not determined, control passes to 618 and it is determined if there is a new pair of known location nodes. For example, a new pair of known location nodes comprises a pair of known location nodes which have not yet been used in pairwise signal transmission for the present localization measurement. If there is not a new pair of known location nodes, the process ends. In various embodiments, the process continues and continues measurements: to increase accuracy, to update the measurement, to account for multipath effect (e.g., repeating the measurement using a different frequency), to propagate position knowledge (e.g., using formerly unknown positioned nodes as known positioned nodes to measure further unknown positioned nodes), of any other appropriate reason for continuing measurements. If there is a new pair of known location nodes, control passes to 600 and the process repeats until the location of each of the unknown location nodes or some portion of the nodes (e.g., enabling outliers to be weighted differently) is known to be within an acceptable error estimate or to have an acceptable certainty level (e.g., an estimate of total error from all location measurements can be divided by the number of measurements in an over-constrained system and more measurements can be made until certainty level is achieved or until no more measurement pairs are available for measurement).

In some embodiments, there are $K_N$ known nodes, transmissions are sent pair-wise from each of the $K_N$ choose 2 possible combinations of known nodes, and these $K_N$ choose 2 time difference of arrival measurements are used to estimate an unknown node's location. In some embodiments, there are $K_N$ known nodes, transmissions are sent pair-wise from a subset of the $K_N$ choose 2 possible combinations of known nodes, and these time difference of arrival measurements are used to estimate an unknown node's location. In some embodiments, a subset is chosen by picking known nodes that are spatially diverse, picking known nodes that are spatially close together, or picking known nodes that are known to produce more accurate measurements of unknown nodes.

In some embodiments, there are $K_N$ known nodes, transmissions are sent M-wise from each of the $K_N$ choose M possible combinations of known nodes, and these $K_N$ choose M time difference of arrival measurements are used to estimate an unknown node's location. In some embodiments, there are $K_N$ known nodes, transmissions are sent M-wise from a subset of the $K_N$ choose M possible combinations of known nodes, and these time difference of arrival measurements are used to estimate an unknown node's location. A transmission sent M-wise is a transmission from M distinct known nodes wherein each of the M nodes transmits a signal at different times, each of the M nodes transmit a signal with a known time offset, or each of the pair of nodes transmits a signal with any other appropriate relative timing.

In some embodiments, pair-wise or M-wise transmissions are received by a plurality of nodes with unknown location, a time difference in arrival estimate is constructed for each node with unknown location, and the time difference in arrival estimate of each node with unknown location is communicated to a gateway of a mesh network (e.g., a node connecting a mesh network to another network—for example, a LAN, WAN, Internet, etc.).

In some embodiments, the difference in time of transmission is calculated locally and the difference is transmitted to computer system.

In some embodiments, the position of unknown nodes is estimated using corrected time difference of arrival in conjunction with mathematical manipulations—for example, solving simultaneous hyperbolic equations using iterative Taylor series, spherical interpolation, divide and conquer methods, converting to spherical equations using an intermediate variable and solving using weighted least squares and/or Lagrange multiplier techniques, or any other appropriate methodology.

Figure 7:
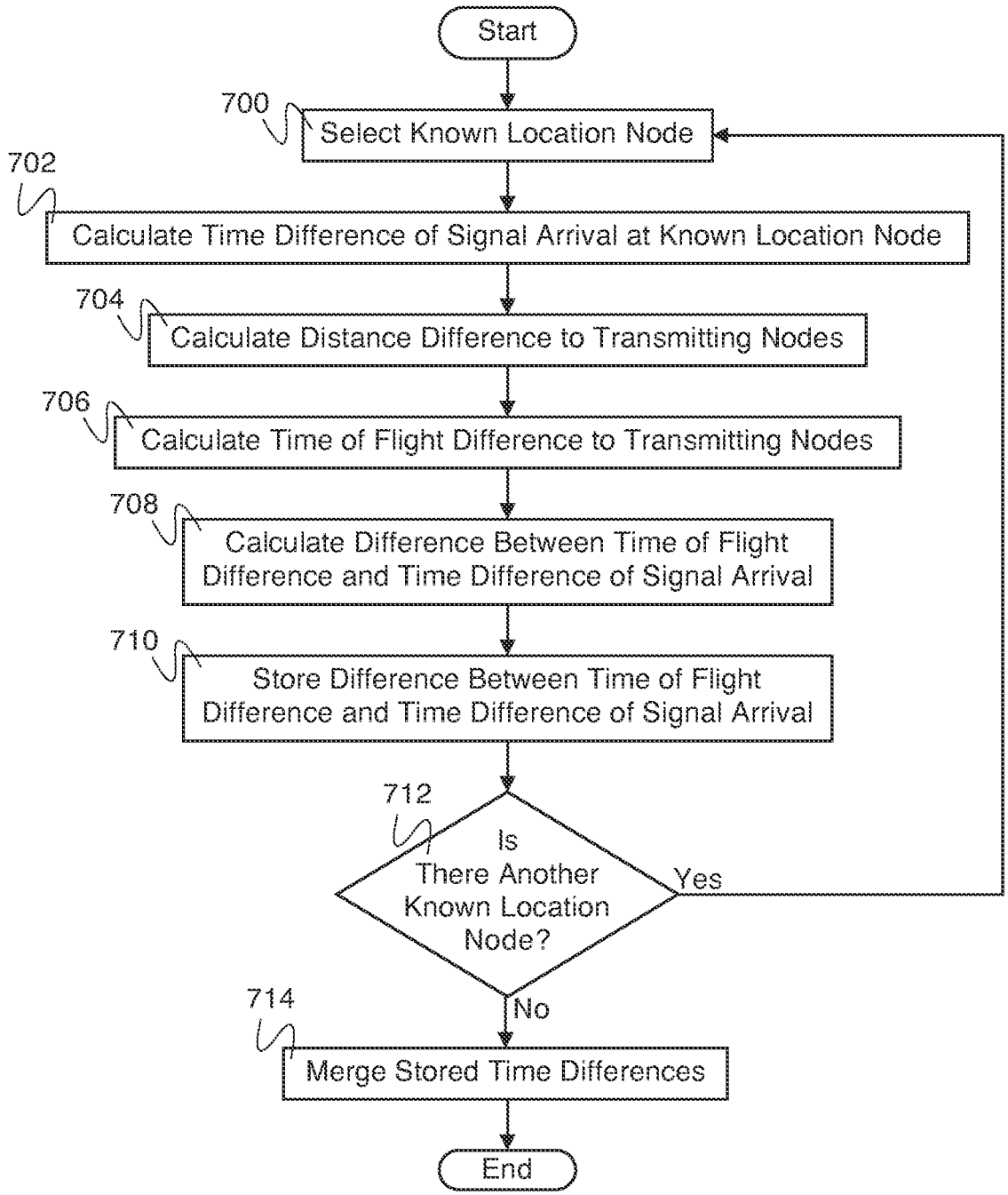
FIG. 7 is a flow diagram illustrating an embodiment of a process for estimating a time between signal transmissions for a pair of nodes.

FIG. 7 is a flow diagram illustrating an embodiment of a process for estimating a time between signal transmissions for a pair of nodes. In some embodiments, the process of FIG. 7 implements 608 of FIG. 6. In the example shown, in 700, a known location node is selected. For example, the known location node selected is one of known location nodes 506 of FIG. 5. In 702, the time difference of signal arrival at the known location node is calculated. In some embodiments, the time difference of signal arrival is calculated from measurements of signal arrival time taken by the known location node. In some embodiments, the known location node has calculated the time difference of signal arrival previously. In some embodiments, the time difference of signal arrival is extracted from data calculated by the known location node. In 704, the distance difference to the transmitting nodes is calculated. The location of the transmitting nodes and of the known location node are all known, so the distance difference from the known location node to the transmitting nodes is calculated by calculating the distance from the known location node to each of the transmitting nodes and subtracting the two distances. In 706, the time of flight difference to the transmitting nodes is calculated. The time of flight difference from the known location node to the transmitting nodes is calculated by dividing the distance difference from the known location node to the transmitting nodes by the speed of light. In some embodiments, the time of flight difference from the known location node to the transmitting nodes is the expected time difference of signal arrival at the known location node if the two transmitting nodes transmit signals at exactly the same time. In some embodiments, the time of flight difference is corrected for multipath propagation effects (e.g., by multiplying by a factor, by adding/subtracting a value, or any other appropriate correction). In 708, the difference between the time of flight difference and the time difference of signal arrival is calculated. The difference between the time of flight difference and the time difference of signal arrival is calculated by subtracting the time of flight difference from the time difference of signal arrival. The difference between the time of flight difference and the time difference of signal arrival is the estimated time difference between signal transmissions at the transmitting nodes. In 710, the difference between the time of flight difference and the time difference of signal arrival is stored.

In 712, it is determined if there is another known location node that has not yet been used to calculate time difference of signal transmissions. If there is another node, control passes to 700, and the process repeats for the new node. If there is not another node, control passes to 714, and the stored time differences are merged. In various embodiments, merging comprises computing a mean, computing a median, computing a mode, computing a weighed average, or computing any other appropriate merging function.

In various embodiments, further calibration measurements are used to correct for frequency differences between different node clocks, phase differences between different node clocks, or any other appropriate differences between different node clocks. In various embodiments, calibration measurements are made using a time difference of flight measurement at a known location node, multiple time difference of flight measurements at a known location node, one or more time difference of flight measurements at multiple known location nodes, or any other appropriate calibration measurement or measurements. For example, a calibration measurement is made after measuring the time of arrival information of a transmission from node A, a transmission from node B, and a transmission from node A again.

Figure 8:
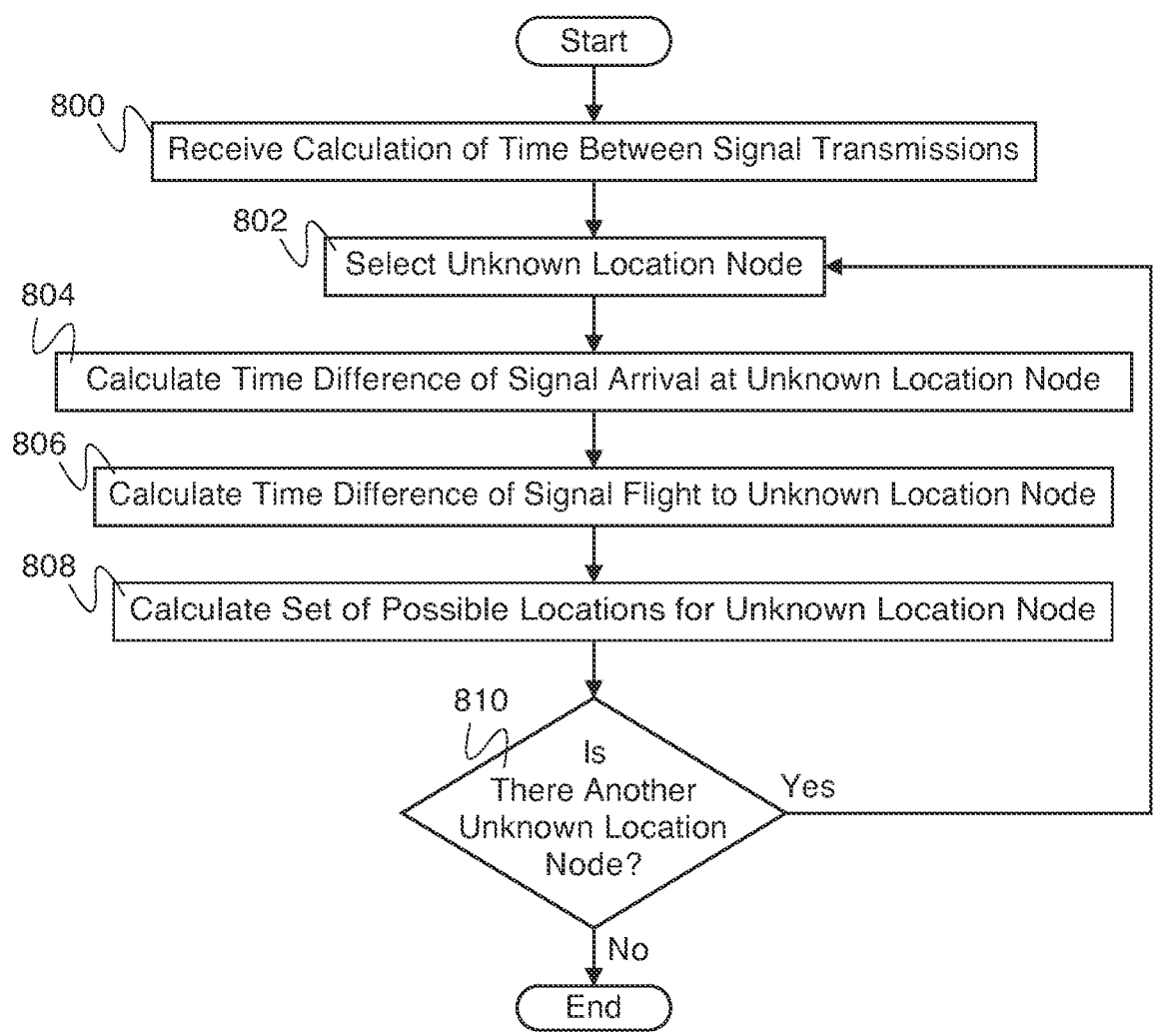
FIG. 8 is a flow diagram illustrating an embodiment of a process for calculating a set of possible node locations for each unknown location node.

FIG. 8 is a flow diagram illustrating an embodiment of a process for calculating a set of possible node locations for each unknown location node. In some embodiments, the flow diagram of FIG. 8 implements 610 of FIG. 6. In the example shown, in 800, the calculation of time between signal transmissions is received. In some embodiments, the calculation of time between signal transmissions is calculated in 608 of FIG. 6 using the process of FIG. 7. In the example shown, in 802, an unknown location node is selected. For example, the unknown node comprises one of unknown location nodes 508 of FIG. 5. In 804, the time difference of signal arrival at the unknown location node is calculated. In some embodiments, the time difference of signal arrival is calculated from measurements of arrival time taken by the unknown location node. In some embodiments, the unknown location node has calculated the time difference of signal arrival previously. In some embodiments, the time difference of signal arrival is extracted from data calculated by the unknown location node. In 806, the time difference of signal flight to the unknown location node is calculated. In some embodiments, the time difference of signal flight to the unknown location node is calculated by subtracting the estimated time between signal transmissions from the time difference of signal arrival at the unknown location node. In 808, the set of possible locations for the unknown location node is calculated. In some embodiments, set of possible locations is calculated by position calculation using time difference of flight measurements (e.g., position calculation using time difference of flight measurements of FIG. 4). In 810, the set of unknown location nodes is checked to see if there is another unknown location node. If there is another unknown location node, control passes to 802 and the process repeats. If there is not another unknown location node, the process ends. In some embodiments, a set of possible locations is calculated by first collecting a plurality of time difference of signal flight to an unknown location node and then solving a matrix equation, wherein a matrix includes as elements two or more time difference of signal flights to the unknown location node. In various embodiments, the set of possible locations comprises a single point, multiple points, a line, a continuous region in three-dimensional space, a collection of distinct continuous regions in three-dimensional space, or any other appropriate set of locations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A node having an unknown location in a network of nodes communicating wirelessly with each other, the node comprising:
   a receiver configured to receive at the node having the unknown location first and second signals respectively transmitted from first and second nodes of the network that have known locations, and to receive a first set of measurements relating to timing of receipt of the first and second signals at a third node of the network having a known location; and
   a processor of the node having the unknown location configured to compute a second set of measurements relating to timing of receipt of the first and second signals at the node, and to determine a location of the node having the unknown location based at least in part on the known locations of the first, second, and third nodes and on the first set of measurements and the second set of measurements.

2. A node as in claim 1, wherein the node having the unknown location communicates with a mesh network of nodes including the first, second and third nodes.

3. A node as in claim 1, wherein the node having the unknown location is a battery powered node, a solar powered node, a node powered by energy scavenging, or a node powered by a power grid.

4. A node as in claim 1, wherein the receiver of the node having the unknown location receives localization signals transmitted from nodes of a second set of nodes each having a known location, wherein each node of said second set of nodes comprises a transmitter configured to transmit a respective one of the localization signals.

5. A node as in claim 4, wherein each localization signal comprises a data packet or an IEEE 802.15.4 compliant data packet.

6. A node as in claim 4, wherein the localization signals are received sequentially or are received concurrently on different frequencies.

7. A node as in claim 4, wherein the second set of location nodes comprises two or more nodes.

8. A node as in claim 4, wherein first, second, and third nodes are nodes of the second set of nodes.

9. A node as in claim 1, wherein the receiver is a radio receiver.

10. A node as in claim 1, wherein the second set of measurements is over-constrained or is heavily over-constrained.

11. A node as in claim 1, wherein the node processor is configured to determine the location of the node having the unknown location based at least in part on a multipath propagation adjustment factor.

12. A node as in claim 1, wherein the first and second sets of measurements include time difference of arrival measurements, and the quality of each time difference of arrival measurement is estimated using a received signal strength indicator for the received first and second signals.

13. A node as in claim 1, wherein one measurement of the first set of measurements or of the second set of measurements comprises a time of arrival of at least one of the first and second signals, or a time difference of arrival of the first and second signals.

14. A node as in claim 1, wherein the first set of measurements are used to determine a first set of time difference of arrival measurements.

15. A node as in claim 14, wherein a time difference of arrival measurement comprises a difference in time of a) a first time of reception of a first signal from a first transmitting node and b) a second time of reception of a second signal from a second transmitting node.

16. A node as in claim 1, wherein the second set of measurements are used to determine a second set of time difference of arrival measurements.

17. A node as in claim 16, wherein the second set of time difference of arrival measurements comprise one time difference of arrival measurement.

18. A node as in claim 16, wherein a time difference of arrival measurement comprises a difference in time of a) a first time of reception of a first signal from a first transmitting node and b) a second time of reception of a second signal from a second transmitting node.

19. A node as in claim 18, wherein the first signal from the first transmitting node and the second signal from the second transmitting node are transmitted at the same time or with a known time offset.

20. A node as in claim 1, wherein the first set of measurements is used to calibrate the second set of measurements.

21. A node as in claim 1, wherein determining the location comprises keeping the determined location within a constrained space.

22. A node as in claim 1, wherein the node having the unknown location is one of a plurality of nodes for which location is determined.

23. A method for determining node locations, comprising:
   receiving, at a node having an unknown location in a network of nodes communicating wirelessly with each other, first and second signals respectively transmitted from first and second nodes of the network having known locations, and to receive a first set of measurements relating to timing of receipt of the first and second signals at a third node having a known location;
   computing a second set measurements relating to timing of receipt of the first and second signals at the node having the unknown location; and
   determining, using a node processor of the node having the unknown location, a location of the node having the unknown location based at least in part on the known locations of the first, second, and third nodes and on the first set of measurements and the second set of measurements.

24. A computer program product for determining node locations, the computer program product being embodied in a non-transitory computer readable storage medium encoded with instructions that, when executed, cause a processor to perform functions to:
   receive, at a node having an unknown location in a network of nodes communicating wirelessly with each other, first and second signals respectively transmitted from first and second nodes of the network having known locations, and receive a first set of measurements relating to timing of receipt of the first and second signals at a third node having a known location;
   compute a second set measurements relating to timing of receipt of the first and second signals at the node having the unknown location; and determine a location of the node having the unknown location based at least in part on the known locations of the first, second, and third nodes and on the first set of measurements and the second set of measurements.

* * * * *